Nov. 22, 1938.  W. I. JONES  2,137,531
FASTENING DEVICE FOR POCKETBOOKS AND THE LIKE
Filed Feb. 6, 1936
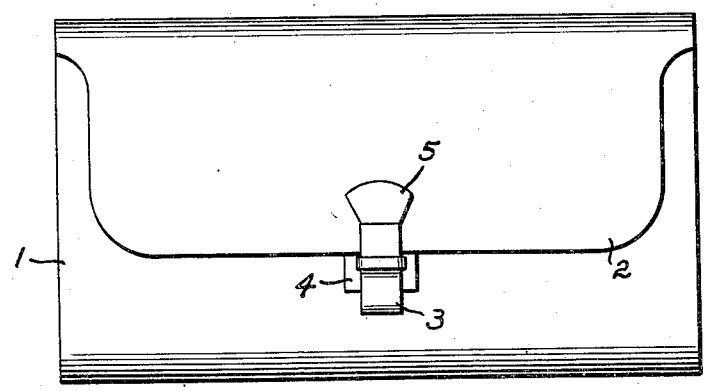
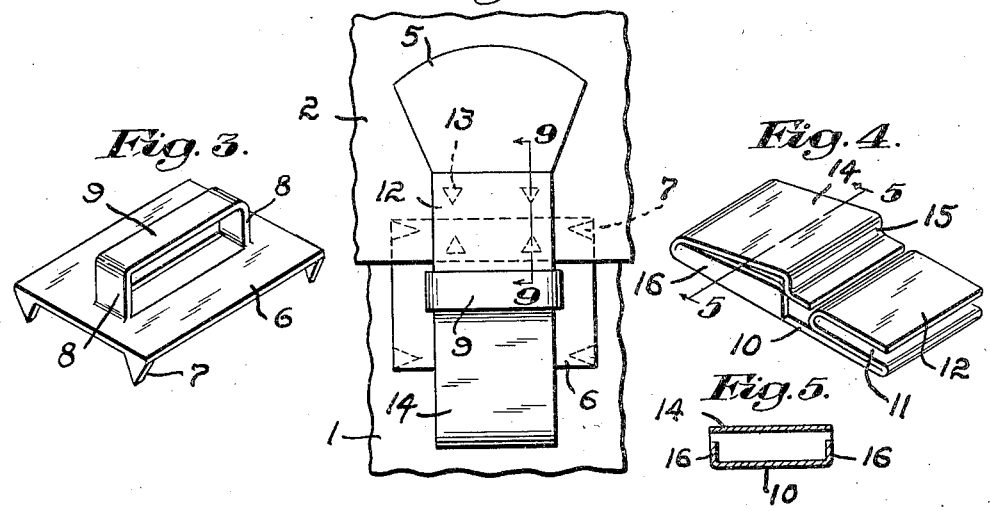
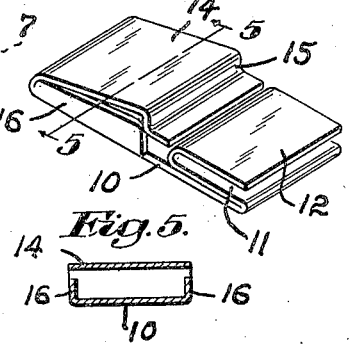
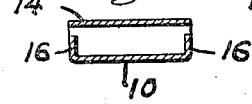
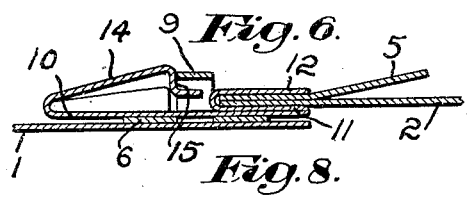
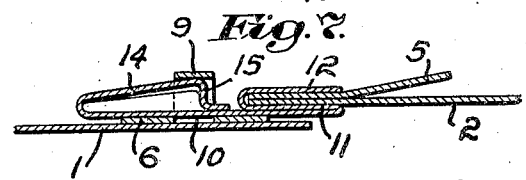
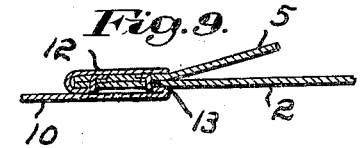
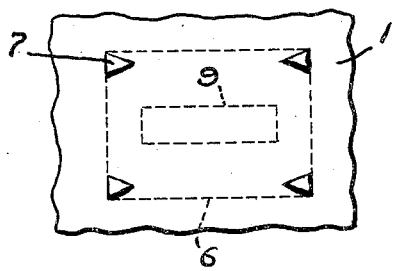
Inventor:
Walter I. Jones
by
Atty.

Patented Nov. 22, 1938

2,137,531

UNITED STATES PATENT OFFICE 2,137,531

FASTENING DEVICE FOR POCKETBOOKS AND THE LIKE

Walter I. Jones, Arlington, Mass., assignor to United-Carr Fastener Corporation, Cambridge, Mass., a corporation of Massachusetts Application February 6, 1936, Serial No. 62,619

1 Claim. (Cl. 292—87)

My invention relates to an improved fastening device for holding the flap means of a pocketbook or similar container in a closed position relative to the body of the container.

Referring to the drawing, in which I have illustrated a preferred embodiment of my invention:

Figure 1 is a plan view of a pocketbook showing the use of my improved fastener device for holding parts of the same in closed position;

Fig. 2 is an enlarged view of the fastening device shown in Fig. 1;

Fig. 3 is a plan view of the socket member of my improved fastening device;

Fig. 4 is a plan view of the stud member of my fastening device;

Fig. 5 is a section taken on the line 5—5 of Fig. 4;

Fig. 6 is a sectional view of the stud member of my fastening device in locked relation with the socket member;

Fig. 7 is a sectional view showing the manner in which the stud member is moved into locked position with the socket member;

Fig. 8 is a rear view of my socket member assembled with a portion of the container wall; and Fig. 9 is a section taken on the line 9—9 of Fig. 2.

Referring to the illustration, I have shown in Fig. 1 a pocketbook of a construction now in common use having a body portion 1 and a flap 2 held in closed position against the front wall of the body portion 1 by means of a fastening device comprising a stud member 3 attached to the flap 2 and a socket member 4 secured to the portion 1 at a suitable position for cooperative fastening engagement with the stud member 3. A pull-tab 5 may be assembled with the stud member 3, as described in detail below, to aid in disengaging the fastener members.

Referring in detail to the particular construction of my improved fastening device, I have shown in Fig. 3 the socket member of my device made of one-piece construction comprising a substantially flat metal base plate 6 having a plurality of integral prongs 7 bent downwardly from the plate 6 and adapted to pierce the material of the container body 1 for securing the socket member thereto (Fig. 8). A substantially U-shaped stud-engaging means is pressed outwardly from the material of the base plate 6 having opposed sides 8—8 and a bridge portion 9 connecting the sides 8—8. The bridge portion 9 is spaced from the base plate 6 and preferably in parallel relationship to the plane of the base, as most clearly shown in Fig. 3.

The stud member of my device, as most clearly shown in Fig. 4, is made from one piece of sheet metal having a substantially flat base plate 10. A flap-engaging means is formed at one end of the base plate 10 by bending the material back upon itself to form a folded portion 11, preferably in adjacent relationship with the plate 10, which extends inwardly for a predetermined distance and then is bent in a return bend with its free end 12 spaced from the folded portion 11 and substantially parallel therewith. The loop portions 11 and 12 enclose a recess adapted to receive a free edge portion of the material of the flap 2 which is then clamped between the portions 11 and 12 so as to secure firmly the stud member to the flap, as most clearly shown in Figs. 6 and 7. I have preferably secured the pull-tab 5 to the stud member (Figs. 6 and 7) by clamping one end between the flap 2 and the free end portion 12. Also, in my preferred form, I have chosen to bend attaching prongs 13 (Figs. 2 and 9) out of the folded portion 11 which extend into the loop recess and pierce portions of the flap 2 and the pull-tab 5 seated within the loop to prevent any possible disengagement of the parts when they are finally assembled together. The material at the opposite end of the plate 10 from the flap-attaching means is bent back to form a spring plate 14 normally spaced from the base plate 10 and disposed in slanting relationship to the plane of the base 10 so as to form a camming surface. The spring plate 14 has a relatively abrupt shouldered means 15 substantially adjacent to the free end thereof. Side walls 16 are preferably bent upwardly from opposite longitudinal edges of the plate 10 (Figs. 4 and 5) which greatly improve the appearance of the member and, in my preferred form, by substantially closing the openings in the sides of the device as shown.

In assembling the parts of the installation, I first secure the socket member 4 to a suitable part of the pocketbook body by inserting the prongs 7 through the container body material 1 and upsetting them to clench the material. The stud member 3 is secured in a suitable position on the flap 2 for coacting with the socket member 4 by clamping the material of the flap between opposed sides 11 and 12 of the loop portion, as described above. To lock the parts of my fastener device, the socket-engaging end of the stud member is moved into position for passage through the stud-receiving aperture of the socket which is bounded by the plane of the plate 6 and the side walls 8 and bridge portion 9 of the U-shaped member. During passage of the stud member through the aperture the slanting surface of the spring plate 14 will engage the bridge 9 in a way to force the plate 14 downwardly by a camming action, as shown in Fig. 7, until the shoulder means 15 has passed beneath the bridge. At this time the plate 14 will return to normal position as a result of the natural spring-action provided by the folded-back construction of the same and unintentional withdrawal of the socket member is prevented by the shoulder 15 which abuts an edge of the bridge portion 9, as shown in Fig. 6. To disengage the fastener member the spring plate 14 may be pressed downwardly by the thumb to enable the shoulder 15 to be pushed or pulled through the socket aperture in the reverse of the action by which the members were engaged. I have preferably shown the shoulder 15 of relatively sharp or abrupt construction, but it is understood that it may be formed to present a less sharp angle so that it may be forced beneath the bridge portion 9 for withdrawal through the socket aperture by merely an easy pull-action upon the tab 5.

As a result of my improved device, I have provided a fastening means of pleasing appearance and capable of satisfactory operation when assembled with a flexible container of the class described. Furthermore, my device is made up of a minimum number of parts capable of being manufactured inexpensively in large quantities.

Although I have illustrated and described a preferred form of my invention, I do not wish to be limited thereby, because the scope of my invention is best set forth in the following claim.

I claim:

A fastening member for a pocketbook or the like container formed from a single piece of metal and adapted to cooperate with a socket member, said fastener member comprising a plate having material at one end thereof folded back upon itself and normally spaced from said plate, said folded portion being yieldable and adapted to be forced toward said plate against the natural spring action of said folded portion during passage through a stud-receiving means associated with the socket member and then returned to normal position after passage through said means to secure said members against unintentional separation and said plate having spaced portions at its other end extending away from said first-mentioned end and having an opening between them for receiving an appropriate part of a container adapted to be moved between said spaced portions axially of said fastening member whereby said spaced portions grip opposed sides of said container for attaching said fastening member to said container.

WALTER I. JONES.